United States Patent [19]

Stein et al.

[11] Patent Number: 4,592,403
[45] Date of Patent: Jun. 3, 1986

[54] EMERGENCY OPERATION RING FOR TUBELESS TIRES IN MOTOR VEHICLES

[75] Inventors: Hermann Stein, Wuppertal-Barmen; Ulrich Piepenbrink, Schwelm, both of Fed. Rep. of Germany

[73] Assignee: Vorwerk & Sohn GmbH & Co. KG, Fed. Rep. of Germany

[21] Appl. No.: 645,098

[22] Filed: Aug. 28, 1984

[30] Foreign Application Priority Data

Aug. 30, 1983 [DE] Fed. Rep. of Germany ....... 3331143

[51] Int. Cl.⁴ .................... B60C 17/06; B60C 17/10
[52] U.S. Cl. .................................. 152/158; 152/520; 152/521
[58] Field of Search ................. 152/152, 158, 330 RF, 152/330 L, 151, 520, 521

[56] References Cited

U.S. PATENT DOCUMENTS

| | | | |
|---|---|---|---|
| 3,407,859 | 10/1968 | Johnson | 152/158 |
| 3,426,821 | 2/1969 | Boileau | 152/158 |
| 3,872,907 | 3/1975 | Curtiss, Jr. et al. | 152/158 |
| 3,981,341 | 9/1976 | Bauer et al. | 152/158 |
| 4,091,854 | 5/1978 | French et al. | 152/158 |
| 4,295,509 | 10/1981 | Stein | 152/158 |
| 4,371,024 | 2/1983 | Stein et al. | 152/158 |
| 4,461,333 | 7/1984 | Filliol et al. | 152/158 |

FOREIGN PATENT DOCUMENTS 2445968 8/1975 Fed. Rep. of Germany.
3008972 4/1981 Fed. Rep. of Germany.

*Primary Examiner*—Lois E. Boland
*Attorney, Agent, or Firm*—Schwartz, Jeffery, Schwaab, Mack, Blumenthal & Evans

[57] ABSTRACT

An emergency operation ring for tubeless pneumatic tires on motor vehicles made of an elastomeric material and mounted on a rim by means of axial clamping pressure. Two support sections extend diagonally upwards and outwards from the base section and define a circumferential channel. The support sections have step shaped outer flanks set back with respect to the base section. At least one circumferential groove is provided contiguous the circumferential channel, and slipping agent is positioned in the groove or grooves. Sealing lips close off the groove and slipping agent when the tire is intact. The wheel load working on the support sections at the beginning of an emergency operation brings the sealing lips into an open position, whereby the slipping agent is released and lubricates the surfaces of the pneumatic tire and the emergency operation ring in contact with each other.

8 Claims, 3 Drawing Figures

EMERGENCY OPERATION RING FOR TUBELESS TIRES IN MOTOR VEHICLES

BACKGROUND OF THE INVENTION

The invention concerns an emergency operation ring for tubeless pneumatic tires in motor vehicles which have two or multi-component rims. The ring has a base section which rests on the rim and at least one circumferential groove which faces the inner wall of the tire tread and contains a slipping agent. In intact pneumatic tires, the groove or grooves are held closed by initial axial tension. At least one of the sealing lips of the groove or grooves forms the working arm of a lever-like circumferential support section. At the beginning of emergency operations, the support section is subject to a pressure increase due to the wheel load transferred to it by the tire cover. The sealing lip connected to the support section is thus lifted from the groove, thereby releasing the slipping agent which functions to lubricate the surfaces of the pneumatic tire in contact with the emergency operation ring.

An emergency operation ring of the above-named type is disclosed in applicants' U.S. Pat. No. 4,371,024, granted Feb. 1, 1983. In the known ring, the entire height of the sides, the base section as well as the upper section, fits against the pneumatic tire. The known ring extends in a dome-shape from the side edges of the upper section to the central plane of the ring. Because of its construction, the known ring has a relatively large volume and a correspondingly high weight. Even a vehicle equipped with only four wheels is considerably burdened by the high weight of the ring, and its road handling is noticeably impaired. This disadvantage is particularly great with larger wheel dimensions. Aside from this, the voluminous ring works as a heat accumulator whose heat energy increases considerably with progressively longer periods of driving. This adversely effects the temperature of the compressed air in the tire as well as the material of the pneumatic tire. Finally, the outer flanks of the ring are in contact with the pneumatic tire along their entire surface area in intact tires. This creates the disadvantage that the surfaces in contact are subject to more or less heavy friction, depending on the air pressure, with corresponding wear.

SUMMARY OF THE INVENTION

It is an object of the present invention to create an emergency operation ring with the least possible weight which affords the defective pneumatic tire an operably stable support. Additionally, the ring should be so designed as not to come in contact with the flanks of the pneumatic tire at minimal tire pressure and during normal driving use.

In the emergency operation ring according to the invention, the two separated circumferential support sections support the defective pneumatic tire by a wide track and give it, in this manner, a slip free rolling surface for a quiet ride. In addition, the support sections possess a high load capability because of their cross-sectional shape; they allow a spacious circumferential channel to form between the support sections, thereby providing an emergency operation ring with reduced material requirements and a corresponding low weight. Advantageously, the heating up of the emergency operation ring is kept within tight limits during the drive because the ring is a rather small heat accumulator due to its minimized volume and large surface area in contact with the circulating air, made possible by the spacious circumferential channel in the middle of the ring and the two crevices at the side of the ring.

The support sections according to the invention, offset toward the center, allow the inner pressure of the pneumatic tire to be minimally proportioned, if need be, without having the flanks of the tires collide with the outer flanks of the support sections during normal driving. In addition, the emergency operation ring according to the invention has the distinctive feature that the support sections extend upwards and outwards. The support sections extend over the base section of the sides if necessary, so that the flanks of the pneumatic tire are supported if they should be dislodged by lateral forces encountered while driving around curves.

Moreover, in the emergency operation ring according to the invention, there is no danger, in case the air pressure in the tire is intentionally held low, that the grooves which contain the slipping agent will open without an emergency operation situation actually occurring. In this case, it is much more likely that the axial sealing pressure on the grooves will be strengthened.

In the case of a single wheel suspension with full floating axles, an emergency operation ring according to the invention with asymetric design can be advantageously employed in which the supporting section facing away from the vehicle has a greater height than the supporting section facing the vehicle. This equalizes the vertical drop of the axles.

Further characteristics and advantageous embodiments of the emergency operation ring according to the invention will be explained herein below when particular reference is made to the application drawings.

BRIEF DESCRIPTION OF THE DRAWINGS

The embodiments of the invention are illustrated in the applicaion drawings in which.

DESCRIPTION OF THE PREFERRED EMBODIMENTS

Figure 1:
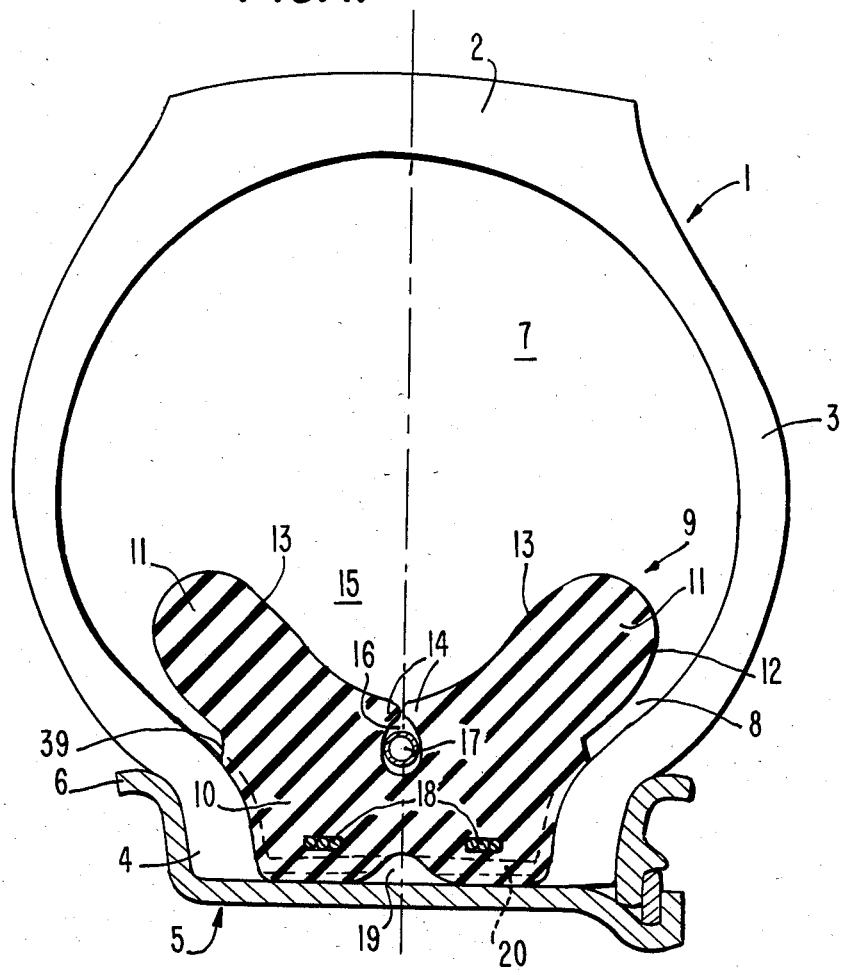
FIG. 1 is a cross section of an emergency operation ring according to the invention inserted in a tubeless pneumatic tire and mounted on a multi-component flat bed rim.

Reference is now made to the application drawings, wherein like parts are indicated by like reference numerals.

Figure 2:
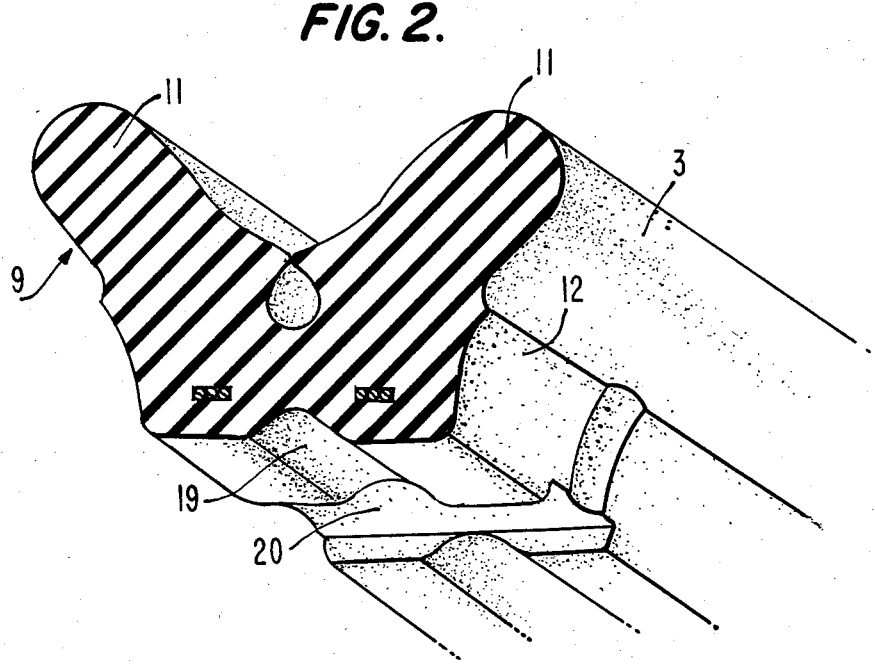
FIG. 2 is a section in perspective of an emergency operation ring according to FIG. 1

In FIGS. 1 and 2, an emergency operation ring 9, made of rubber or another elastomeric material, is shown along with a pneumatic tire 1 mounted on a multi-component flat bed rim 5 of average size. The emergency operation ring 9 has a base section 10 which merges with two circumferential support sections 11 that extend diagonally upward and outward. These support sections 11 enclose a groove-like circumferential channel 15. The crown surfaces 13, which faces the tire cover 2, rise distinctly toward the outside from the circumferential channel 15. The outer flanks 12 of the ring are set back toward the inside with respect to the base section 10 by means of a shoulder 39, thus creating a ring crevice 8 on each side between the outer flanks 12 and the tire flanks 3. A circumferential groove 16 is contiguous with and positioned in the middle of the base of the circumferential channel 15, and is sealed by sealing lips 14 which extend from the support sections 11. A thin walled tube 17 containing a slipping agent is enclosed in the groove 16.

The base section 10 is reinforced by two bundles of steel wire 18 in order to give the emergency operation ring 9 a tight fit on the flat bed rim 5. On the side facing the flat bed rim 5, the ring has a circumferential tunnel 19 which is connected with several flow channels 20 distributed along the circumference of the ring and leading to the flanks of the base section 10, thereby connecting the circumferential tunnel 19 with the inner space 7 of the pneumatic tire 1. This system of channels allows air entering from a valve (now shown) to flow trouble-free into the inner space 7.

The emergency operation ring 9 is produced so that its base section 10 has a width which is greater than the clear breadth of the beads 4 of the tire. In assembling the emergency operation ring 9, pneumatic tire 1 and flat bed rim 5, the base section 10 is pressed together to the specified size so that it fits between the beads of the tire 4 which are braced by the beads of the rim 6. This procedure assures that the emergency operation ring 9 has an advantageously taut fit on the sides and, at the same time, that a reliable sealing pressure is applied to the circumferential groove 16 in which the tube 17 containing the slipping agent is located. Should the pneumatic tire 1 lose its air through external effects, the load on the tire will press the tire flat. The tire cover 2 is then supported on the inside by, and the wheel load thus transferred to, the crown surfaces 13 of the two support sections 11. This crashing of the wheel load presses down the free ends of the lever arm-like support sections 11 into the ring crevices 8, thereby effecting a lever action which releases the sealing lips 14 from their sealing position and opens the groove 16. At this instant, the tube 17 is accelerated out of the opened groove 16 by the centrifugal force of the driving operation. The tube is then ripped open between the contacting surfaces of the tire cover 2 and the emergency operation ring 9, and the slipping agent is released. The dispensed slipping agent distributes itself immediately and leads to a considerable reduction in friction between the surfaces in contact.

The slipping agents used are substances which have no swelling or other affects damaging to elastomers. For example, polyglycols or the salts of fatty acids can be satisfactorily used.

Figure 3:
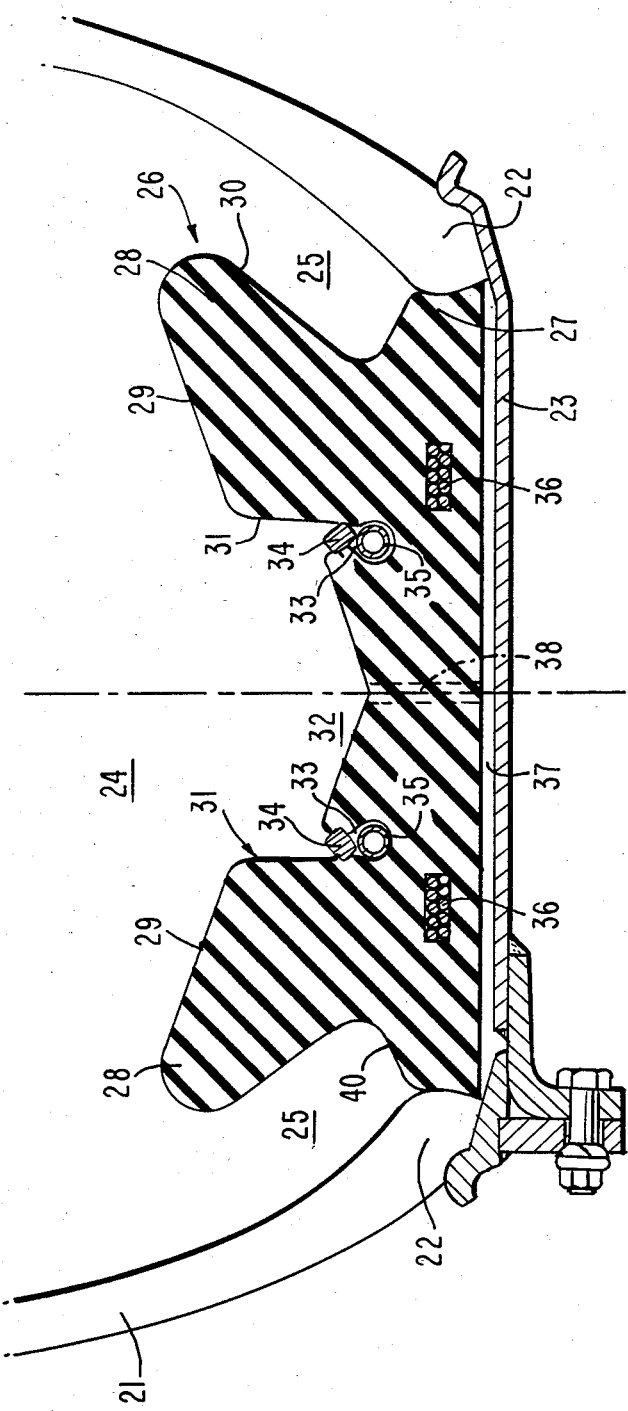
FIG. 3 is a cross section of an emergency operation ring according to the invention intended for larger wheel dimensions, inserted in a tubeless pneumatic tire and mounted on a two-component 15° tapered rim.

An emergency operation ring 26 according to the invention designed for an extremely wide pneumatic tire 21 with accompanying two component 15° tapered rim 23 is illustrated in FIG. 3. This emergency operation ring 26 possesses an exceptionally flat construction height. In particular, the support sections 28 have a distinctly slim cross-sectional shape so that the crown surfaces 29 are greatly inclined, and the outer flanks 30 are greatly set back with respect to the flanks of the base section 27 by means of a large shoulder 40. The centrally located deep bed circumferential channel 32 and the ring crevices 25 provided by each support section 28 take up a relatively large volume. Because of this material conserving design, the weight of this emergency operation ring 26 is optimally minimized, thereby bringing about, in particular, stability in the handling of the motor vehicle both during emergency operation and with intact pneumatic tires 21. Because of this weight advantage, it is of no great concern that the axial clamping pressure between the tire beads 22 and the base section 27 held between them is insufficient to seal the grooves 33 on the inner flanks 31 of the support sections. This problem is solved by sealing the grooves 33, which hold the slipping agent containing tubes 35, with tension spacers 34.

The base section 27 is reinforced by at least two bundles of steel wires 36. The air pumped in through a valve (not shown) is led into the inner space 24 of the pneumatic tire 21 by air flow channels 37 and 38. The same principal of operation is thus realized in this emergency operation ring 26 as is realized by the above described emergency operation ring 9.

What is claimed is:

1. An emergency operation ring for incorporation in a tubeless tire having flank portions, beads and a tread cover, said tire being adapted to be mounted on a rim, said ring comprising:
   (a) a base section adapted to be mounted on the rim, said base section extending fully between said beads and being laterally compressed when mounted;
   (b) two support sections extending diagonally upward and outward from the base section, said support sections being curved at the tops thereof and defining a centrally positioned, groove-shaped circumferential channel, said support sections supporting the tread cover of said tire during loss of air;
   (c) each support section including an outer flank spaced from the opposed flank of the tire to define therebetween a ring crevice, and centrally located sealing lip means at the bottom of said channel, said sealing lip means of said support sections when said tire is inflated being laterally biased by the compressive loading of said base section and defining therebetween annular groove means adapted to openly communicate with said channel when said tire loses air;
   (d) a shoulder on each side of the base section which biases the support sections back toward the longitudinal center of the ring so as to further define said ring crevice;
   (e) a slipping agent located in said groove means, whereby said sealing lips are separated by lever action when the tread cover engages the support sections during loss of air so as to expose said groove means to said channel, thereby releasing said slipping agent and lubricating the surfaces of the emergency operation ring and the tire in contact therewith, said support sections during such lever action extending into said crevices.

2. An emergency operation ring as claimed in claim 1, wherein said slipping agent is contained in enclosure means mounted in said groove means.

3. An emergency operation ring as claimed in claim 1, further comprising supplementary tension spacers for aid in sealing said groove means.

4. An emergency operation ring as claimed in claim 1, wherein each of said support sections further comprise a crown surface extending upwardly and outwardly from said channel to form a contacting top curved surface for engagement by the tread cover when the tire is deflated.

5. An emergency operation ring according to claim 1, wherein the support section on the side away from the longitudinal center of the vehicle has a greater height than the corresponding support section on the side closest to the vehicle.

6. An emergency operation ring according to claim 1, further including channel means formed in said ring to permit air to be admitted into the interior of the tire.

7. An emergency operation ring according to claim 1, wherein said sealing lips are centrally located and in tight sealing engagement when said tire is intact, said lips defining a single groove containing said slipping agent.

8. An emergency operation ring according to claim 1, wherein said groove means comprise two separate grooves defined by pairs of sealing lips formed on said base section and said support sections on either side of a longitudinal plane thorugh said ring, and supplementary tension spacers inserted between said pairs of lips for sealing said grooves prior to loss of air in the tire, at which time the support sections are forced laterally outwardly by the tread cover so as to open said grooves.

* * * * *